Patented Dec. 25, 1928.

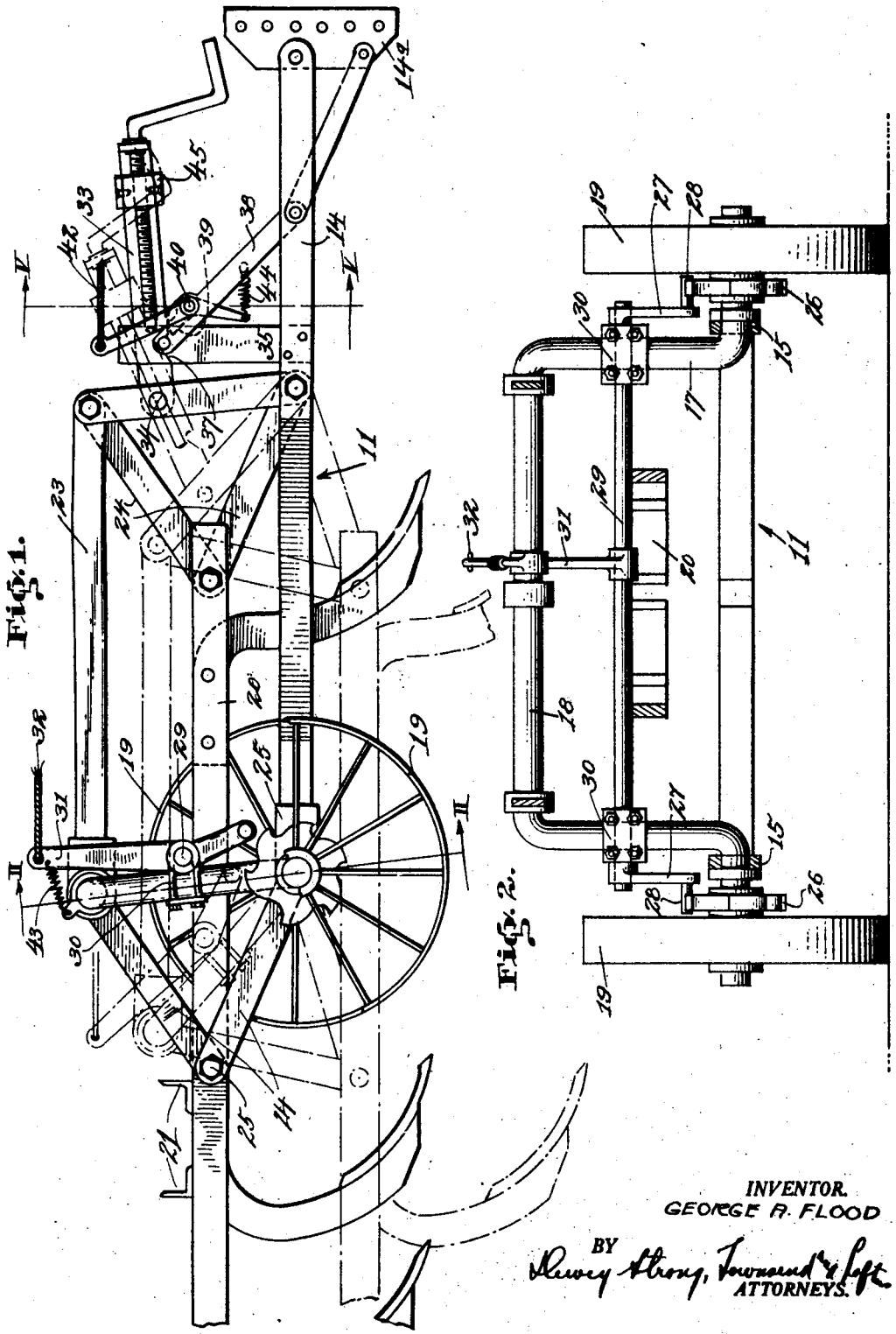

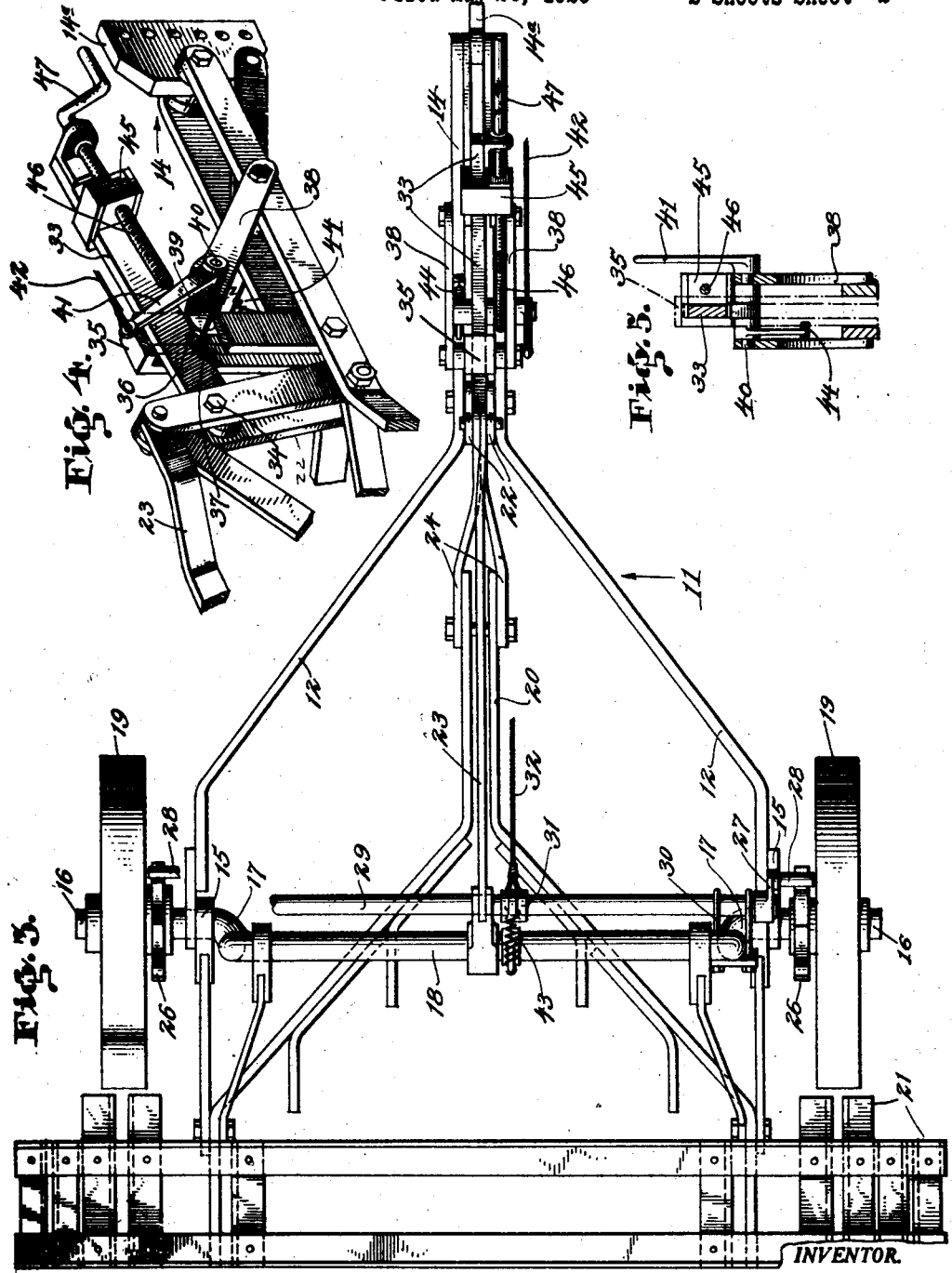

1,696,710

UNITED STATES PATENT OFFICE.

GEORGE A. FLOOD, OF LOS ANGELES, CALIFORNIA.

CULTIVATOR.

Application filed May 24, 1926. Serial No. 111,106.

This invention relates to agricultural implements and particularly pertains to a combined orchard cultivator and vineyard plow.

It is the principal object of the present invention to provide a generally improved implement of the character referred to which is of simple and inexpensive construction, and wherein the plow frame may be so operated by a single control that its forward and rear ends will move vertically in unison a uniform distance, which plow frame is so constructed that the blades carried thereby will be spaced apart both transversely and longitudinally.

In carrying out this object I provide a main frame supported by ground wheels which carries a plow frame substantially triangular in shape. The shape of this plow frame permits the blades carried thereby to be spaced apart transversely and longitudinally of the machine. To operate the plow frame a crank axle is provided which is connected by links to the rear end of the plow frame. Forwardly of the crank axle is an arm which is adapted to swing in unison with the crank axle. This arm is connected with the forward end of the plow frame so that when swinging movement is imparted to the crank axle it will be accompanied by vertical movement of the forward and rear ends of the plow frame, which will be vertically moved in unison a uniform amount.

One form which the invention may assume is exemplified in the following description and illustrated by way of example in the accompanying drawings, in which:

Fig. 1 is a side elevation of an implement embodying the preferred form of my invention and disclosing the plow frame in raised position in full lines and in lowered position in broken lines.

Fig. 2 is a transverse sectional view taken on line II—II of Fig. 1.

Fig. 3 is a plan view of the implement.

Fig. 4 is a fragmentary view in perspective showing the hand lift device.

Fig. 5 is a transverse sectional view taken on line V—V of Fig. 1.

Referring more particularly to the accompanying drawings, 10 indicates an agricultural implement which in the present instance is illustrated as a cultivator. It is to be understood, however, that by minor changes in construction the implement may be constructed as a plow or similar machine.

In the preferred embodiment of the present invention, the implement is constructed with a main frame 11 formed of longitudinally disposed side frames 12 which converge toward the forward end of the implement. At this end the side frames terminate in a drawbar structure 14 having a clevis 14ª, by means of which the implement may be connected to a tractor.

The side frame members 12 are each fitted at their rear ends with axle bearings 15 which rotatably receive horizontal trunnions 16 of a crank axle 17. The crank portion 18 of this axle 17 is disposed intermediate the bearings 15 and assumes a substantially vertical position. The end trunnions 16 of the axle 17 project through the axle bearings 15 and are each fitted with a rotatable ground wheel 19. These ground wheels act as means to support the main frame above the ground and permit it to be drawn by a tractor.

A plow frame 20 is suspended within the main frame beneath the axle 17. The plow frame 20 is disposed substantially centrally beneath the axle so as to distribute its weight upon opposite sides of the axis of the ground wheels. The plow frame 20 is substantially triangular in shape similar to that of the main frame 11 and is fitted with brackets 21 from which cultivator or plow blade standards may be suspended.

Due to the triangular shape of the plow frame 20, the plow blades carried thereby will be spaced apart both transversely and longitudinally of the implement which is a very desirable feature, inasmuch as it prevents clogging when the implement is used as a cultivator. Likewise the shape permits the blades to be disposed other than at the rear of the implement and thereby renders the machine more evenly balanced, distributing the load over the entire frame.

It should be stated that plow bottoms may be substituted for the cultivator blades if desired and, likewise, other analogous tools may be used in connection with the present machine with equal efficiency.

The plow frame 20 is suspended within the main frame in a manner permitting it to be raised and lowered as desired. That is, it may be lowered to engage the ground or elevated and retained in an inoperative position above the ground. For this purpose, I provide the crank portion 18 of the axle 17 which when the plow frame is elevated is disposed in a substantially vertical position, as shown in Fig. 1.

Forwardly of the axle and pivotally connected at their lower ends to the frame is a pair of forward arms 22 which are disposed parallel to the vertical arms of the crank portion 18 of the axle 17, and of a length equal thereto. The upper ends of these arms 22 are connected by a longitudinal connecting bar 23 to the crank portion of the axle 17. The connections between the opposite ends of this connecting bar 23 and the axle and the arms 22 are pivotal ones.

As the axle is turnable in the bearings 15 and the arms 22 are pivotally connected to the frame at a point substantially in horizontal alignment with the bearings 15, the crank portion 18 of the axle and the levers 22 will swing in unison equal distances due to the provision of the connecting rod 23.

The crank portion 18 of the axle 17 and the arms 22 are connected to the plow frame by rearwardly extending sets of links 24. There are two sets of these links provided for the rear end of the plow frame and one set provided for the forward end thereof. Each set of links comprises a rearwardly and downwardly extending link and a rearwardly and upwardly extending link which are pivoted to the plow frame at the same pivotal point. At the rear of the implement the other ends of the upper links are pivoted to the crank portion of the axle, and the other ends of the lower links are pivoted to the trunnions 16 of the axle, or on the same axis as the pivotal point of the crank portion of the axle.

In the forward set of links the upper and lower links are pivotally connected at their adjacent ends to the forward end of the plow frame as at 25. The upper end of the upper link of the forward set pivotally connects to the pivotal point between the connecting rod and the arms 22. The lower end of the lower link is pivoted at the same point as the lower end of arms 22. By the provision of these sets of links, when forward or rearward swinging movement is imparted to the arms 22 or to the crank portion 18 of the axle 17, the plow frame 20 will be elevated or lowered as the case may be.

It will also be noticed that the crank portion 18 of the axle 17 is connected to the rear end of the plow frame, and that the arms 22 are connected to the forward end of the plow frame. As the crank portion 18 of the axle and the arms 22 are connected by the connecting rod 23, any movement imparted to one will be simultaneously imparted to the other, and that they will swing in unison a uniform amount. Therefore, the forward and rearward ends of the plow frame will be moved vertically in either direction in unison a uniform amount.

I have provided a power lift for the plow frame which may be controlled from the tractor drawing the plow. This power lift includes ratchet wheels 26 relatively secured to the ground wheels 19. Arranged for cooperation with the ratchet wheels 26 are crank arms 27, each of which carry a pin 28 which may be engaged with the teeth of the ratchet wheels 26.

The crank arms 27 are secured on a transverse shaft 29, journalled at its ends in bearings 30 carried by the vertical arms of the crank portion 18 of the axle. Centrally of this shaft 29 a lever 31 is provided which extends vertically, and is connected at its upper end with a control cable 32. This control cable may be led to the tractor connected with the implement so that when a pull is exerted on the cable 32, the pins 28 will be engaged with the ratchet wheels 26.

If the implement is being drawn forwardly, such engagement of the pins 28 with the ratchets 26 will lock the axle to the wheels 19, and cause forward rotation of the wheels 19 to swing the crank portion 18 of the axle forwardly. This forward movement of the crank portion of the axle will be transmitted through the connecting rod 23 to the forward arms 22, as described. As these members are connected by the links 24 to the plow frame 20, the latter will be elevated to an inoperative position.

To latch the plow frame in a raised or inoperative position, I provide a latch bar 33 which is pivoted at its rear end to the arms 22 as at 34. This latch bar 33 extends through a guide 35 which carries a transverse latch pin 36. A notch 37 is formed in the lower edge of the latch bar 33 for engagement with the latch pin 36. This notch 37 is so positioned relative to the arms 22 that its engagement with the pin 36 will retain the plow frame 20 in the proper elevated position.

The guide 35 is bolted at its lower end to the drawbar structure and is held rigidly in its vertical position by a diagonally arranged brace bar 38, which is connected at its upper end to the upper end of the guide 35 and at its lower end to the drawbar at a point forwardly of the point where the guide 35 connects with the drawbar.

To disengage the notch 37 from the latch pin 36 to permit the plow frame to lower and engage the ground, a pawl 39 is pivotally mounted on the diagonal brace bar 38. This pawl is secured on a pivot pin 40 upon which a lever 41 is also secured. The upper end of this lever 41 may be connected by a cable 42 to the tractor, so that the pawl may be operated from the tractor to disengage the notch 37 from the latch pin and permit the plow frame to lower when desired.

It will be noticed in the drawings, that the pawl 39 is adapted to engage the under side of the latch bar 33, and when the lever 41 is swung forwardly, the pawl will raise the latch bar 33 and disengage the notch 37 from the latch pin 36.

Tension springs 43 are provided to normally retain the pins 28 out of engagement with the ratchet wheels 26, and tension springs 44 are provided to retain the pawl 39 out of engagement with the latch bar 33.

So as to enable the depth penetrated by the plow to be regulated, a gauge nut 45 is slidably mounted on the latch bar 33. A feed screw 46 is collared in the forward end of the latch bar 33, and extends longitudinally of the latch bar. This feed screw 46 threadedly engages the gauge nut 45 and upon rotation will advance or retract the gauge nut 45 along the latch bar 33. To facilitate rotation of the feed screw, it is provided at its forward end with a crank handle 47.

The distance between the gauge nut 45 and the forward side of the guide 35 determines the amount which the plow frame may lower. That is to say, when the notch 37 is disengaged from the pin 36, the plow frame will lower and draw the latch bar 33 rearwardly through the guide 35 until the gauge nut 45 abuts against the guide 35. It is therefore obvious that by adjusting the position of the gauge nut 45 along the latch bar 33, that the depth penetrated by the blades may be regulated.

It should be stated that the feed screw 46 and its associate mechanism may be used to raise the plow frame when the implement is not in motion. When the plow frame is in lowered position, the gauge nut 45 will be abutted against the forward end of the guide 35. By revolving the crank 47 in a direction tending to feed the nut forwardly on the feed screw, the latch bar 33 will be drawn forwardly due to the fact that the gauge nut 45 cannot move rearwardly because of its abutment against the stationary guide 35. The feed screw may then be revolved until the notch 37 engages the latch pin 36 to retain the latch bar in latched position relative to the guide 35, thus holding the plow frame 20 in an elevated or inoperative position. When this has been done, the crank 47 may be revolved in the opposite direction to properly space the gauge nut 45 from the vertical guide 35, to gauge the amount of lowering movement to be permitted to the plow frame 20 when it is again lowered to engage the ground.

In operation of the device, assuming that the plow frame is in elevated or inoperative position, to lower the frame to engage the ground a pull is exerted on the control cable 42. This will swing the lever 41 forwardly, which will operate the pawl 39 to elevate the latch bar 33 and disengage the notch 37 therein from the latch pin 36. The weight of the plow frame will then cause it to lower until the plows carried thereby engage the ground. The "suck" of the blades will then draw the frame downwardly until the gauge nut 45 abuts against the vertical guide 35, preventing further downward movement of the plow frame.

It is desired to point out the fact that due to the provision of the forward arms 22 and the crank portion 18 of the axle, and the connections between these elements and the plow frame, that all of the plows carried by the frame will engage the ground simultaneously, due to the fact that a uniform amount of lowering movement will be imparted to the opposite ends of the plow frame 20.

If the implement is in motion and it is desired to elevate the plow frame when negotiating a turn or otherwise, a pull may be exerted on the control cable 32 which will swing the arm 31 forwardly. This movement will be transmitted through the shaft 29 to the arms 27 and cause the pins 28 on these arms to engage with the ratchet wheels 26, thus locking the crank portion 18 of the axle to the ground wheels.

Due to this connection, forward movement of the ground wheels 19 will swing the crank portion 18 of the axle forwardly, and through the connecting rod 23 and the forward arms 22 and the links 24, will cause elevation of the plow frame 20. This movement of the plow frame will be continued until the crank portion 18 of the axle is swung forwardly to a position where the notch 37 in the latch bar 33 will have engaged with the latch pin 36 and the guide 35. The pins 28 may then be disengaged from the ratchet wheels 26 by releasing the cable 42.

If the implement is not in motion and it is desired to raise the plow frame, it is only necessary to revolve the feed screw 46 in a direction forcing the gauge nut 45 toward the guide 35. As the guide 35 will hold the feed nut 45 stationary, the latch bar 33 will be moved forwardly until the notch 37 therein engages the latch pin 36.

To limit the depth penetrated by the cultivator blades, the gauge nut 45 may be adjusted along the latch bar 33 by means of the feed screw 46. This as previously described, will limit the downward movement of the plow frame 20, and consequently limit the depth penetrated by the cultivator blades.

As previously stated, the cultivator blades are spaced apart both longitudinally and transversely of the plow frame. This prevents the entire load from being sustained solely at the rear of the implement. Likewise it prevents clogging of the blades, which often occurs when the blades are substantially in transverse alignment.

From the foregoing it is obvious that I have provided a very efficient implement, which is a considerable improvement over the art, and it is to be understood that while I have shown the preferred embodiment of the invention, the form and proportion of the parts may be changed by those skilled in the art without departing from the spirit of the invention, as defined in the appended claims.

Having thus described my invention, what I claim and desire to secure by Letters Patent is:

1. An implement of the character described comprising a main frame, a crank axle carried by the main frame, ground wheels carried by said axle, a plow frame, an operative connection between one end of said plow frame and said axle, means operatively connected to the other end of the plow frame and to said axle whereby swinging movement of said axle will simultaneously impart a uniform amount of vertical movement to both ends of the plow frame, and operative means for latching said axle to said wheels whereby forward movement of the implement will act to impart swinging movement to the axle and thereby elevate the plow frame.

2. An implement of the character described comprising a main frame, a crank axle arranged transversely thereof and carrying ground wheels, the crank portion of said axle being disposed intermediate said wheels, a plow frame connected with the main frame for vertical movement with relation thereto, a connection between the crank portion of said axle and one end of said plow frame, and means operatively connected to the other end of the plow frame and to said crank portion of the axle whereby swinging movement of the crank portion of the axle will simultaneously impart a uniform amount of vertical movement to both ends of the plow frame, ratchet wheels secured to said ground wheels, and latch means carried by said axle and operative whereby they may be engaged and disengaged with the ratchet wheels, engagement of said latch means with said ratchet wheels acting to latch the axle to the wheels so that forward movement of the implement will through the medium of the wheels and axle elevate the plow frame.

3. An implement of the character described comprising a main frame, a crank axle carried at the rear end thereof and extending transversely of the main frame, ground wheels carried by said axle, the crank portion of said axle being disposed intermediate said wheels, a plow frame disposed intermediate said ground wheels and longitudinally upon opposite sides of said axle, links connecting said plow frame to the main frame whereby it may move vertically with relation to the main frame, an arm carried by the main frame forwardly of the axle, a connection between said arm and said axle whereby the axle and arm will swing in unison, links connecting the crank portion of the axle to the rear end of the plow frame, a link connection between said arm and the forward end of the plow frame whereby swinging movement of said crank portion of the axle will through said arm and said links impart a uniform amount of vertical movement to both ends of said plow frame in unison, and means adapted to automatically latch said plow frame in an inoperative position when the same has been elevated, said means comprising a vertical guide, a latch bar connected at one end to said arm and projecting through said guide, and cooperating means on the latch bar and said arm capable of engaging when the plow frame is elevated to maintain the plow frame in an inoperative position.

4. An implement of the character described comprising a main frame, a crank axle carried at the rear end thereof and extending transversely of the main frame, ground wheels carried by said axle, the crank portion of said axle being disposed intermediate said wheels, a plow frame disposed intermediate said ground wheels and longitudinally upon opposite sides of said axle, links connecting said plow frame to the main frame whereby it may move vertically with relation to the main frame, an arm carried by the main frame forwardly of the axle, a connection between said arm and said axle whereby the axle and arm will swing in unison, links connecting the crank portion of the axle to the rear end of the plow frame, a link connection between said arm and the forward end of the plow frame whereby swinging movement of said crank portion of the axle will through said arm and said links impart a uniform amount of vertical movement to both ends of said plow frame in unison, a guide member carried by the frame forwardly of said arm, a longitudinally extending latch bar guided for longitudinal movement in said guide and connected at its rear end to said arm, a gauge nut slidably mounted on said latch bar, a feed screw extending longitudinally in the latch bar and collared thereto and threadedly engaging said gauge nut whereby rotation of the feed screw will move said nut longitudinally on the arm, said gauge nut being adapted to abut against said guide to limit the downward movement of the plow frame.

5. An implement of the character described comprising a main frame, a crank axle carried at the rear end thereof and extending transversely of the main frame, ground wheels carried by said axle, the crank portion of said axle being disposed intermediate said wheels, a plow frame disposed intermediate said ground wheels and longitudinally upon opposite sides of said axle, links connecting said plow frame to the main frame whereby it may move vertically with relation to the main frame, an arm carried by the main frame forwardly of the axle, a connection between said arm and said axle whereby the axle and arm will swing in unison, links connecting the crank portion of the axle to the rear end of the plow frame, a link connection between said arm and the forward end of the plow frame whereby swinging movement of said crank portion of the axle will through said arm and said links impart a uniform amount of vertical movement to both ends of said plow frame in unison, a guide member carried by the frame forwardly of said arm, a longitudinally disposed latch bar guided for longitudinal movement in said guide member and connected at its rear end to said arm, cooperative latch means on the latch bar and the guide member for automatically latching the plow frame in an inoperative position when the same is elevated, and means operative from a point comparatively remote from the implement for disengaging the latching connection between the latch bar and guide to permit the plow frame to lower, and means adjustably mounted on the latch bar and adapted to engage said guide member to limit the downward movement of the plow frame.

6. An implement of the character described comprising a main frame, a crank axle carried at the rear end thereof and extending transversely of the main frame, ground wheels carried by said axle, the crank portion of said axle being disposed intermediate said wheels, a plow frame disposed intermediate said ground wheels and longitudinally upon opposite sides of said axle, links connecting said plow frame to the main frame whereby it may move vertically with relation to the main frame, an arm carried by the main frame forwardly of the axle, a connection between said arm and said axle whereby the axle and arm will swing in unison, links connecting the crank portion of the axle to the rear end of the plow frame, a link connection between said arm and the forward end of the plow frame whereby swinging movement of said crank portion of the axle will through said arm and said links impart a uniform amount of vertical movement to both ends of said plow frame in unison, a guide member carried by the frame forwardly of said arm, a longitudinally disposed latch bar guided for longitudinal movement in said guide member and connected at its rear end to said arm, cooperative latch means on the latch bar and the guide member for automatically latching the plow frame in an inoperative position when the same is elevated, said means comprising a notch in the latch bar and a pin carried by the guide engageable with said notch, a pivotal member carried by the guide and engageable with said latch bar, a lever relatively fixed to said pivotal member whereby the latter may be operated to disengage the notch from the pin and permit the plow frame to lower, a gauge member mounted on the latch bar forwardly of the guide and adapted to engage the guide when the plow frame is lowered to limit the lowering movement thereof, and operative means for adjusting the position of said gauge nut on the latch bar to regulate the lowering movement of the plow, said means and said gauge nut being operative to elevate the plow frame.

7. An implement of the character described comprising a main frame, an axle arranged transversely of said frame and journalled at the rear thereof, the intermediate portion of said axle being bail shaped, an arm pivoted at its lower end to the frame forwardly of the axle and arranged in parallelism with the bail portion of the axle, a connecting bar pivoted at its ends to the outer ends of the bail and arm whereby they will swing in a plane longitudinally of the frame in unison, a plow frame arranged for vertical movement with respect to said main frame, parallel links of equal length connecting the outer ends of the bail and arm to the plow frame, parallel links connecting the plow frame to the main frame, said links being of the same length as the links connecting the bail and arm to the frame, the links connecting the plow frame with the main frame being pivoted to the main frame at the same point that the arm and axle are pivoted thereto, the other ends of said latter links being pivoted to the plow frame at the same point that the links connecting the arm and bail to the plow frame are pivoted whereby longitudinal swinging movement of the arm and bail with respect to the main frame will simultaneously impart an uniform amount of vertical movement to both ends of the plow frame relative to the main frame.

8. An implement of the character described comprising a main frame, an axle arranged transversely thereof and journalled at its ends in the main frame, ground wheels mounted at the outer ends of said axle, a plow frame, the intermediate portion of said axle being formed in the shape of a bail and extending substantially vertically, an arm pivotally connected at its lower end to the frame forwardly of the axle and extending substantially vertically in parallelism with the bail portion of the axle, a connecting bar connecting the upper end of the bail with the upper end of said arm, a pair of front links of equal length extending rearwardly, the forward ends of said links being connected one to the outer end of the arm at the point where the connecting bar connects with the arm, the other being pivoted to the frame at the point where the arm is pivoted to the main frame, the rear ends of said links being connected to the plow frame by a common pivot, pairs of rear links extending rearwardly connecting the outer and inner ends of the bail to the plow frame, the other ends of said links being connected by a common pivot to the plow frame, the front and rear links being of equal lengths whereby swinging movement imparted to the bail will act to raise and lower the plow frame.

9. An implement of the character described comprising a main frame, an axle arranged transversely thereof and journalled at its ends in the main frame, ground wheels mounted at the outer ends of said axle, a plow frame, the intermediate portion of said axle being formed in the shape of a bail and extending substantially vertically, an arm pivotally connected at its lower end to the frame forwardly of the axle and extending substantially vertically in parallelism with the bail portion of the axle, a connecting bar connecting the upper end of the bail with the upper end of said arm, a pair of front links of equal length extending rearwardly, the forward ends of said links being connected one to the outer end of the arm at the point where the connecting bar connects with the arm, the other being pivoted to the frame at the point where the arm is pivoted to the main frame, the rear ends of said links being connected to the plow frame by a common pivot, pairs of rear links extending rearwardly connecting the outer and inner ends of the bail to the plow frame, the other ends of said links being connected by a common pivot to the plow frame, the front and rear links being of equal lengths whereby swinging movement imparted to the bail will act to raise and lower the plow frame, means for latching said bail to the ground wheels whereby forward movement of the implement will swing the bail upwardly and forwardly to elevate the plow frame, said latch means being operative from a remote point.

10. An implement of the character described comprising a main frame, an axle arranged transversely thereof and journalled at its ends in the main frame, ground wheels mounted at the outer ends of said axle, a plow frame, the intermediate portion of said axle being formed in the shape of a bail and extending substantially vertically, an arm pivotally connected at its lower end to the frame forwardly of the axle and extending substantially vertically in parallelism with the bail portion of the axle, a connecting bar connecting the upper end of the bail with the upper end of said arm, a pair of front links of equal length extending rearwardly, the forward ends of said links being connected one to the outer end of the arm at the point where the connecting bar connects with the arm, the other being pivoted to the frame at the point where the arm is pivoted to the main frame, the rear ends of said links being connected to the plow frame by a common pivot, pairs of rear links extending rearwardly connecting the outer and inner ends of the bail to the plow frame, the other ends of said links being connected by a common pivot to the plow frame, the front and rear links being of equal lengths whereby swinging movement imparted to the bail will act to raise and lower the plow frame, ratchet wheels secured to the ground wheels, and latch means carried by the bail and operative from a remote point whereby the latch means may be engaged with the ratchet wheels to latch the bail to the ground wheels so that forward movement of the implement will cause swinging movement of the axle in unison with the ground wheels to elevate the frame.

11. An implement of the character described comprising a main frame, an axle arranged transversely thereof and journalled at its ends in the main frame, ground wheels mounted at the outer ends of said axle, a plow frame, the intermediate portion of said axle being formed in the shape of a bail and extending substantially vertically, an arm pivotally connected at its lower end to the frame forwardly of the axle and extending substantially vertically in parallelism with the bail portion of the axle, a connecting bar connecting the upper end of the bail with the upper end of said arm, a pair of front links of equal length extending rearwardly, the forward ends of said links being connected one to the outer end of the arm at the point where the connecting bar connects with the arm, the other being pivoted to the frame at the point where the arm is pivoted to the main frame, the rear ends of said links being connected to the plow frame by a common pivot, pairs of rear links extending rearwardly connecting the outer and inner ends of the bail to the plow frame, the other ends of said links being connected by a common pivot to the plow frame, the front and rear links being of equal lengths whereby swinging movement imparted to the bail will act to raise and lower the plow frame, means for latching said bail to the ground wheels whereby forward movement of the implement will swing the bail upwardly and forwardly to elevate the plow frame, said latch means being operative from a remote point, and means for automatically latching said frame in an elevated position comprising a latch bar extending forwardly and having a notch therein, a guide member having a pin engageable with said notch and adapted to engage the same when the notch registers with the pin, and means for disengaging said pin from the notch.

12. An implement of the character described comprising a main frame, an axle arranged transversely thereof and journalled at its ends in the main frame, ground wheels mounted at the outer ends of said axle, a plow frame, the intermediate portion of said axle being formed in the shape of a bail and extending substantially vertically, an arm pivotally connected at its lower end to the frame forwardly of the axle and extending substantially vertically in parallelism with the bail portion of the axle, a connecting bar connecting the upper end of the bail with the upper end of said arm, a pair of front links of equal length extending rearwardly, the forward ends of said links being connected one to the outer end of the arm at the point where the connecting bar connects with the arm, the other being pivoted to the frame at the point where the arm is pivoted to the main frame, the rear ends of said links being connected to the plow frame by a common pivot, pairs of rear links extending rearwardly connecting the outer and inner ends of the bail to the plow frame, the other ends of said links being connected by a common pivot to the plow frame, the front and rear links being of equal lengths whereby swinging movement imparted to the bail will act to raise and lower the plow frame, a longitudinally disposed latch bar pivotally connected at one end to said arm, a guide member carried by the frame forwardly of said arm and in which said latch bar is guided, cooperative latch means on the latch bar and guide member for automatically latching the plow frame in an inoperative position when the same is elevated, and means operative from a point comparatively remote from the implement for disengaging the latching connection between the latch bar and guide to permit the plow frame to lower.

13. An implement of the character described comprising a main frame, an axle arranged transversely thereof and journalled at its ends in the main frame, ground wheels mounted at the outer ends of said axle, a plow frame, the intermediate portion of said axle being formed in the shape of a bail and extending substantially vertically, an arm pivotally connected at its lower end to the frame forwardly of the axle and extending substantially vertically in parallelism with the bail portion of the axle, a connecting bar connecting the upper end of the bail with the upper end of said arm, a pair of front links of equal length extending rearwardly, the forward ends of said links being connected one to the outer end of the arm at the point where the connecting bar connects with the arm, the other being pivoted to the frame at the point where the arm is pivoted to the main frame, the rear ends of said links being connected to the plow frame by a common pivot, pairs of rear links extending rearwardly connecting the outer and inner ends of the bail to the plow frame, the other ends of said links being connected by a common pivot to the plow frame, the front and rear links being of equal lengths whereby swinging movement imparted to the bail will act to raise and lower the plow frame, a longitudinally disposed latch bar pivotally connected at one end to said arm, a guide member carried by the frame forwardly of said arm and in which said latch bar is guided, cooperative latch means on the latch bar and guide member for automatically latching the plow frame in an inoperative position when the same is elevated, means operative from a point comparatively remote from the implement for disengaging the latching connection between the latch bar and guide to permit the plow frame to lower, and means adjustable along said latch bar and adapted to engage said guide member to limit the downward movement of the plow frame.

14. An implement of the character described comprising a main frame, an axle arranged transversely thereof and journalled at its ends in the main frame, ground wheels mounted at the outer ends of said axle, a plow frame, the intermediate portion of said axle being formed in the shape of a bail and extending substantially vertically, an arm pivotally connected at its lower end to the frame forwardly of the axle and extending substantially vertically in parallelism with the bail portion of the axle, a connecting bar connecting the upper end of the bail with the upper end of said arm, a pair of front links of equal length extending rearwardly, the forward ends of said links being connected one to the outer end of the arm at the point where the connecting bar connects with the arm, the other being pivoted to the frame at the point where the arm is pivoted to the main frame, the rear ends of said links being connected to the plow frame by a common pivot, pairs of rear links extending rearwardly connecting the outer and inner ends of the bail to the plow frame, the other ends of said links being connected by a common pivot to the plow frame, the front and rear links being of equal lengths whereby swinging movement imparted to the bail will act to raise and lower the plow frame, a latch bar pivoted at its rear end to said arm and extending forwardly, a guide member extending vertically of the main frame forwardly of said arm and through which said latch bar is guided, a screw shaft carried by said latch bar, a member threadedly connected to said screw shaft to move along the latch bar when the screw shaft is revolved whereby an abutment between said member and said guide and continued rotation of the shaft will cause the latch bar to move forwardly with respect to the main frame and elevate the plow frame.

GEORGE A. FLOOD.